United States Patent [19]
Craven

[11] 3,871,246
[45] Mar. 18, 1975

[54] MACHINE TOOLS
[75] Inventor: Donald R. Craven, Rockford, Ill.
[73] Assignee: The Babcock & Wilcox Company, New York, N.Y.
[22] Filed: Nov. 1, 1973
[21] Appl. No.: 411,658

[52] U.S. Cl.......... 74/665 GD, 408/133, 74/665 GE
[51] Int. Cl............................................ F16h 37/06
[58] Field of Search ..... 74/665 GD, 665 GE, 125.5, 74/425; 408/133

[56] References Cited
UNITED STATES PATENTS
3,132,541    5/1964    Muthler.............................. 408/133

Primary Examiner—Wesley S. Ratliff, Jr.
Attorney, Agent, or Firm—Barnes, Kisselle, Raisch & Choate

[57] ABSTRACT

A machine tool comprising a base on which a support is movable by a lead screw toward and away from a stop in a manner to drive the support toward the stop at a first higher speed and thereafter at a second lower speed and to accurately stop the support against the stop each time.

6 Claims, 5 Drawing Figures

MACHINE TOOLS

This invention relates to machine tools and particularly to machine tools wherein a support is movable toward a fixed abutment or stop.

BACKGROUND OF THE INVENTION

In various types of machine tools, it is common to have a support such as a slide movable on a base toward and away from a stop. More specifically, a common construction comprises a slide which is propelled along the way of a machine by a lead screw. The lead screw is conventionally driven by a first reversible motor in a rapid movement toward and away from the stop. A second motor is provided which is normally operated continuously and functions upon de-energization of the first motor and engagement of a clutch to drive the lead screw at a slower speed toward the stop. The engagement of the clutch is usually initiated by a limit switch actuated by the slide which de-energizes the first motor and engages the clutch to provide the driving connection from the second motor. In various applications of such a machine tool, for example, in boring, it is essential that the slide or support moves a predetermined distance and a fixed abutment or stop is often used to provide such a control. However, even though the stop is fixed, it is well known that solid materials are elastic in varying degrees and the stop is not absolutely rigid. Thus, stoppage of the slide will not occur abruptly and variable deformation between the slide and stop will result in a variation of the position where the slide finally comes to rest.

Accordingly, among the objects of the invention are to provide a machine tool having a driving system wherein a more accurate stoppage of the slide against the fixed stop is obtained; wherein the repeated movement of the slide against the stop is accurate and produces reproduceable results; which is relatively simple in construction; which can be readily adapted to conventional machine tools; and which can be easily serviced.

DESCRIPTION OF THE DRAWINGS

FIG. 5 is a fragmentary longitudinal sectional view of a further modification.

DESCRIPTION

This invention is particularly applicable to a machine having a worm-gear actuated member which is stopped in its travel by contact against a fixed abutment or stop.

Figure 1:
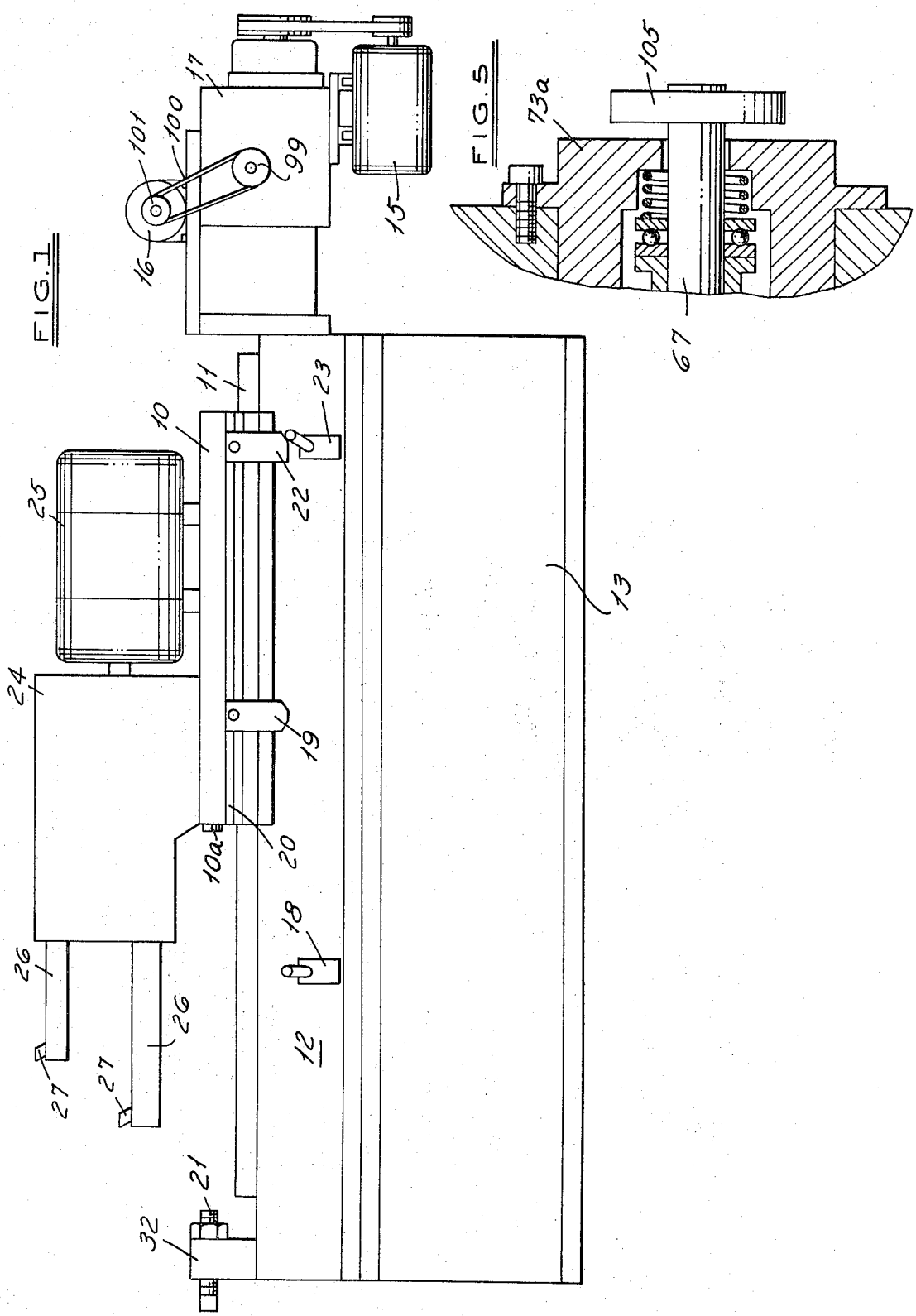
FIG. 1 is a side elevational view of a machine embodying the invention.

A representative machine of this type is shown in FIG. 1 wherein the actuated member is a slide 10 mounted for moving along conventional ways 11 which are fixed to a sub-base 12 which, in turn, is mounted on a main base 13. Slide 10 is propelled along the ways 11 by a lead-screw 14 (FIG. 2) journalled for rotation on sub-base 12. As will presently be described in more detail, lead-screw 14 is rotated by selective driving relation with a first rapid traverse motor 15 or a second slow traverse motor 16. The rapid traverse motor 15 is electrically reversible and, when drivingly employed, causes relatively rapid movement of the slide 10 either forward (to the left in FIG. 1) or backward. Through the use of gearing within transmission 17, the motor 16 imparts relatively slower motion to the slide 10, when drivingly engaged. This slower motion is most commonly unidirectional. However, there are cases in which it is required that the feed motor 16 be electrically reversible. The bidirectional use of motor 16 will be described as an alternate following description of the more usual case of unidirectional slow slide motion.

In a typical use of the machine of FIG. 1, motor 15 is first caused to drive the slide 10 rapidly forward (left in FIG. 1) a preselected distance. Travel of this preselected distance is sensed by some suitable device such as a limit switch 18 actuated by a cam 19. The cam 19 is adjustable along a rail 20 on slide 10 for presetting the extent of rapid forward motion. Actuation of limit switch 18 acts through circuitry not shown to electrically de-energize the motor 15. Actuation of limit switch 18, through additional circuitry not shown, also serves to engage a clutch (to be further described hereinafter) which causes motor 16 to drive the slide 10 further forward at greatly reduced speed. Motor 16 is energized electrically at all times.

Eventually the front end of slide 10 makes contact with the rugged stop screw 21 which arrests the forward motion of slide 10 by forceful obstruction and forward force against the screw is maintained for a prescribed time referred to as dwell time.

At the expiration of the dwell time, motor 16 is disengaged from lead-screw 14, and motor 15 is electrically started in reverse to move slide 10 rapidly backward until a cam 22 thereon actuates a limit switch 23 which stops motor 15 (reverse actuation of limit switch 18, during return of the slide is rendered ineffective by circuitry design techniques well known in the art).

Numerous uses for mechanically stopped machine members are found in various fields of application. One frequently encountered machine tool example is illustrated in FIG. 1. In this example, a gear box 24 is mounted on slide 10. The gears in box 24 are driven by a motor 25. Protruding from the front end of gear box 24 and driven by the gears are one or more boring bars 26. Projecting radially from each boring bar is a single point cutting tool 27 commonly used for removing material from the inner periphery of a cylindrical opening. In FIG. 1, it may be considered that a work holding device (not shown) is located to left of the base 13 and holds a work piece having two holes to be bored by the cutting tools 27.

It is often required that boring must be to an accurate depth dimension, for example, two thousandths of an inch or less, in one or both holes. An example would be boring a counterbore where the step between counterbore and throughbore is accurately located. From abundant experience, it is well known that accurate boring depth cannot be maintained consistently from work piece to work piece by causing reversal of the slide merely by actuating a limit switch. Inaccuracies occur due to variations in the switch itself, response time of the motor circuit contactors, variable friction in the slide drive, and other factors etc. Thus, it is essentially universal practice to use a so-called positive stop, such as stop screw 21, when accuracy of slide stopping position is imperative.

Figure 2:
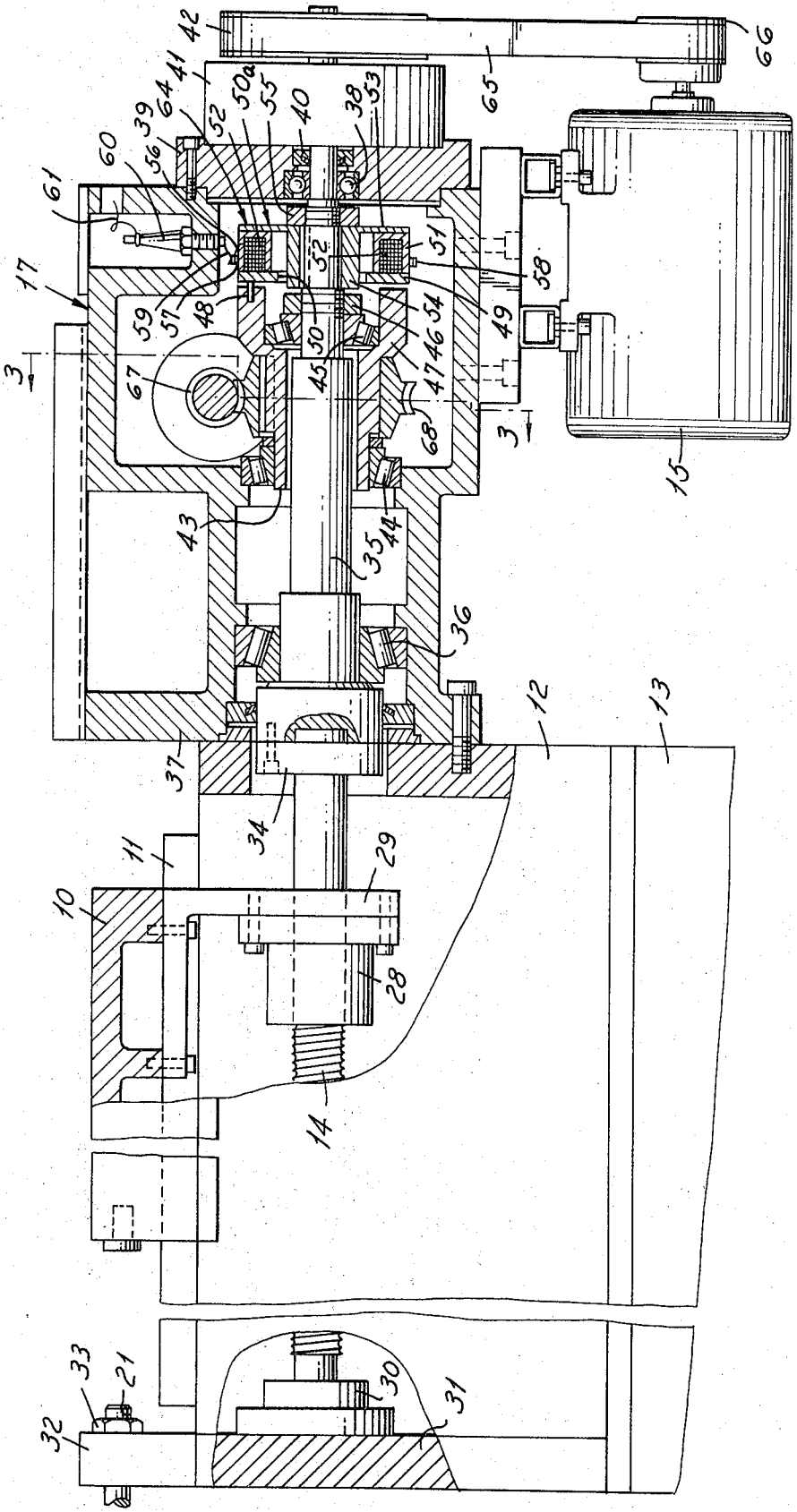
FIG. 2 is a fragmentary part sectional side elevational view on an enlarged scale of a portion of the machine shown in FIG. 1.

Referring to FIG. 2, a ball bearing nut 28 is mounted on slide 10 by a bracket 29, and mates with lead-screw 14. The front end of screw 14 is rotatably supported in an anti-friction bearing cartridge 30 secured to the front wall 31 of the sub-base 12. The front wall also has an upward extension 32 through which the stop screw 21 is threaded for adjustment. Screw 21 is locked in an adjusted position by a lock nut 33.

The rear end of screw 14 is attached by a coupling device 34 to a driving shaft 35 located within the transmission 17. The front end of shaft 35 is rotatably supported by a tapered roller bearing 36 mounted in the housing 37 of transmission 17. The rear end of shaft 35 is supported by a radial ball bearing 38 received in a counterbore in a flanged plug 39 fitted into an opening in the housing 37. Beyond the bearing 38, shaft 35 extends through a lubricant seal 40, brake 41 and into a pulley 42. Though not shown, the shaft 35 is keyed to the rotor of brake 41 and to pulley 42.

Inside the transmission 17, shaft 35 is concentrically surrounded by a hollow shaft 43. Shaft 43 is supported at its front end by tapered roller bearing 44 whose outer race is received in a counterbore in the housing 37. The rear end of shaft 43 is supported by the tapered roller bearing 45 whose inner race is fitted to a stepped diameter portion of shaft 35.

Thus, shaft 35 is fully supported radially relative to the housing 37 by the front bearing 36 and rear bearing 38 (the latter being related rigidly to housing 37 by plug 39). Again radially, the front of shaft 43 is related to housing 37 directly through bearing 44. The rear of shaft 43 is related to shaft 35, and thus to housing 37 by bearing 45. The axial location of shafts 35 and 43 is jointly controlled by the tapered roller bearings 36, 44 and 45. Tightening of a lock nut 46, on a threaded section of shaft 35, causes the thrust loading of bearing 36 against that of bearing 44 in relation to housing 37; this thrust being transmitted by way of bearing 45. Thus, lock nut 46 establishes the axial positions of both shafts 35 and 43. Bearing 38 is the rear end radial locator for both shafts. By the bearing arrangement just described, either shaft 35 or shaft 43 may be rotated independently of the other.

An enlarged cup shaped extension 47 is provided on the rear end of shaft 43. Extension 47 has a plurality of holes therein for loosely receiving corresponding pins 48 of which one only is shown. A plate 49 is attached to the pins 48 as by welding. Plate 49 has a central hole 50 therein. The plate 49 is of ferromagnetic material except that a thin layer of high friction material may be applied to its rear face.

Rearward from the plate 49 is a toroidal electromagnet 50a. Electro-magnet 50a comprises a toroidal core 51 made of ferromagnetic material and having a U-shaped cross section. Within the cavity defined by the U-shaped cross-section is a wire coil 52 wound concentric with the shaft 35. When direct current is passed through this coil, magnetic flux is produced which is directed through the core 51 making the front of its outer periphery magnetically of one polarity such as north or south and the front of its inner periphery of opposite polarity such as south or north. The plate 49 provides a low reluctance path for the said magnetic flux. Thus, when current flows in the coil 52, the plate 49 is magnetically attracted to the electro-magnet 50a while there is no attraction when there is no current.

The toroidal core 51 is secured, as by welding, to a plate 53 having an integral hub portion 54 which surrounds, and is keyed to the shaft 35 and is held in place by the nut 55.

One end of the coil 52 is connected to a lead 56 which passes outwardly through a small insulated hole in the core 51 and connects to a conductive slip-ring 58. Ring 57 surrounds the periphery of the core 51 and is separated therefrom by an insulating ring 57. Rings 57 and 58 are cemented or otherwise secured to each other and ring 57 is secured to core 51 so that the rings rotate with the core. Electrical contact is made with ring 58 by a metal brush 59, which is secured to a conducting rod through an insulating bushing 60. The top of the conducting rod is connected by a wire 61 to a source of direct current (not shown). The inner end of coil 52 is electrically connected through a lead to the hub 54 and hence to the body of the machine (or ground). To energize the electro-magnet 50, D.C. potential is applied to wire 61 and ground.

The plate 49, the magnet 50a and parts attached to magnet 50a constitute an electromagnetic clutch 64 which can establish or release a driving relation between shaft 43 and shaft 35. The clutch as a whole is now designated 64. The plate 49, by way of the pins 48, is the clutch part associated with shaft 43 while the magnet 50a and associated members, is the clutch part associated with shaft 35. When the clutch 64 is energized, by current in coil 52, the attraction of electromagnet 50a for plate 49 causes a driving friction between the plate 49 and the front face of the electromagnet 50. When the clutch 64 is not energized, only minimal incidental friction exists and the shafts 35 and 43 are not in driving relation.

The clutch 64, as described, is only one of many types of clutches which are commercially available and may be adapted to the general structure shown. For example, clutches are available which have a plurality of simultaneously engaged friction interfaces (so called multi-disc clutches) as opposed to the described single interface between plate 49 and electro-magnet 50a. As a further example, some available clutches use two slip-rings connected to the coil ends instead of one ring and ground. Indeed, clutches may be had in which the coil is non-rotating and the actuating flux is transmitted to the rotating parts through an air gap. All such commonly known types of clutches are deemed to be equivalents where adaptable to the general construction shown.

When the clutch 64 is disengaged, the shaft 35 and the screw 14 may be driven in either direction by the motor 15 acting through pulley 42, belt 65 and pulley 66. The direction of screw rotation will correspond to the direction of the motor 15, as determined by electrical connection.

As previously mentioned, shaft 35 passes through the brake 41 and is keyed to the rotor thereof. Brake 41 may be of the type which is normally set by springs and released by an electro-magnet. Its purpose is merely to hold the screw 14 against unintentional rotation when it is not being driven. Since this holding function is optional and does not contribute to the significant operation of the machine, it will be ignored hereafter in this description. For the present purpose, the brake 41 may be regarded as not present at all or as being electrically released whenever screw 14 is intentionally rotated.

In the typical prior art machine, shaft 43 is constantly rotating when the machine is in use. This constant rotation is in the direction to produce forward motion of slide 10 whenever shaft 43 is drivingly connected to shaft 35 through the clutch. That is, if screw 14 has right-hand threads, shaft 43 constantly rotates counterclockwise as viewed from the rear (from the right end of FIG. 2). Shaft 43 is rotated by rotation of a worm 67 engaged with worm-wheel 68.

In the prior art, worm 67 is directly driven by motor 16.

Figure 3:
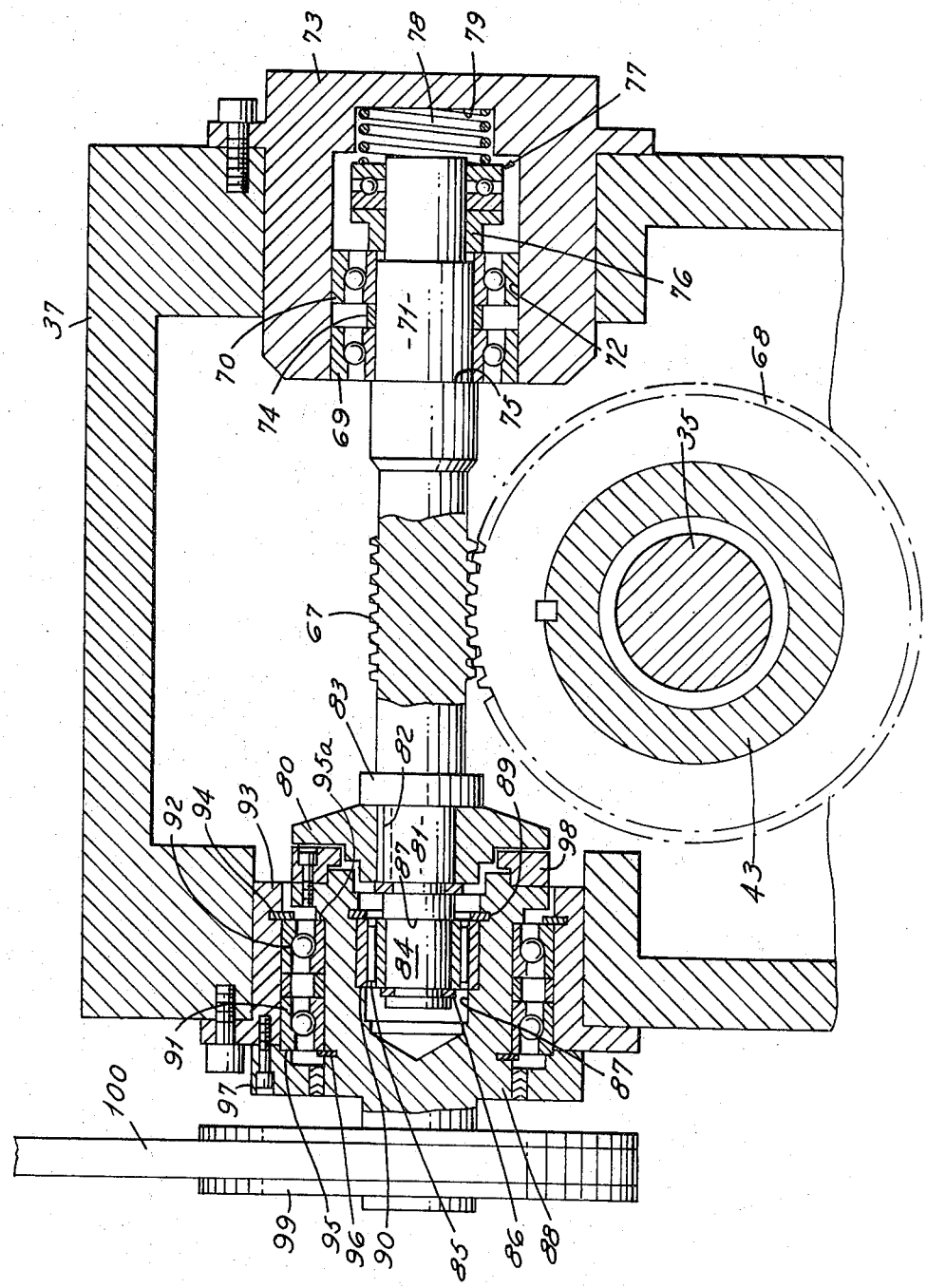
FIG. 3 is a fragmentary sectional view on an enlarged scale taken along the line 3—3 in FIG. 2.

Assuming a right-hand helix on worm 67 as in FIG. 3, the motor 16 drives to produce the aforesaid counterclockwise rotation of shaft 43. As will presently be apparent, it is important that the helix angle of worm and worm-wheel 67 and 68 be beyond the known critical angle for reversibility. That is, this angle must be such that the combination of force vector-angle and coefficient of friction be such as to preclude rotation of the worm 67 by the application of torque to the shaft 43. In common terms, the worm drive must be self-locking or non-reversible. The speed ratio of the worm to worm gear is such that shaft 43 turns much more slowly than does shaft 35 when the latter is driven by motor 15.

In the prior art, a normal cycle of machine operation will start by energizing motor 15 in its forward direction with clutch 64 disengaged. This drives the slide 10 forward at relatively high speed until cam 19 actuates limit switch 18. This switch causes motor 15 to be electrically disconnected and the clutch 64 to be engaged. Inertias of the rotor in motor 15 and of attached pulleys, shafts, and parts will tend to cause continuing forward motion of slide 10. However, engagement of clutch 64 whill apply severe restraint to such continued motion. Although shaft 43 is rotating in the same direction as shaft 35, in the prior art, the very substantial difference in speed causes slippage at the interface of disc 49 and core 51 so that the clutch becomes effectively a brake in reducing the speed of shaft 35. This braking action is possible because of the above described non-reversibility of the worm to worm-wheel drive. That is, the torque produced by inertia cannot cause speeding up of the worm 67. However, this torque is transmitted to the worm as a force along its axis which must be sustained by the bearings that support worm 67.

When the speed of shaft 35 has been reduced to that of shaft 43, slipping of clutch 64 ceases and thereafter shaft 35 is driven, still in the forward direction, by shaft 43 through clutch 64. Thus, promptly after actuation of limit switch 18, the slide 10 is moving forward at its slow or feed rate. During this continued motion, the disconnected motor 15 is driven idly and slowly by belt 65.

It may be noted parenthetically that several expedients are known in the prior art for enhancing the rate of transition from high to low speed of travel of slide 10. For example, the motor 15 may be electrically connected in reverse for a brief period and then disconnected as it reaches a predetermined low speed. As a second example, if the brake 41 is included in the machine, it may be briefly disconnected electrically (spring set) so that is can aid in slowing down shaft 35. These and other expedients are desirable principally to reduce high and intermediate speed overruns past the desired slow-down point chosen by setting the position of cam 19. Another value of slowing aids is to reduce wear on the friction faces of clutch 64 which, at best, must be recognized as a wear-prone component. The reduction of time involved in each engagement of the clutch will prolong the number of engagements feasible between repairs of the clutch. These expedients need not be described in detail since they constitute common knowledge and are not specifically pertinent to the invention yet to be described. As the slide 10 continues forward, some part of its front end, for instance, a hardened button 10a eventually abuts the hardened stop screw 21. This abruptly halts the forward motion of the slide and stops rotation of the screw 14.

The torque capacity of clutch 64 is such as to allow slipping of this clutch when the screw 14 and shaft 35 stop. Motor 16, worm 67 and shaft 43 continue to rotate.

In the parlance of the art, a stop member such as screw 21 is called a "positive stop" since it presumably stops the moving member at a positive or definite location. However, in order to appreciate certain problems in the prior art and certain objectives of this invention, it is necessary to examine this terminology critically.

It is a well known scientific fact that all solid materials are elastic in varying degrees and no material is perfectly rigid. Thus, when the button 10a abuts the screw 21, the stoppage is not perfectly abrupt either in time or space. In order to accomplish stoppage, the opposing force must equal the force urging further motion. All bodies involved in this opposition of forces are subject to elastic deformation sufficient to sustain the deforming forces. In the present case, some of the major deformations involved will be mentioned to illustrate the principle. On the resisting side of the force balance, stop 21 will be axially compressed, the wall 32 will be deflected forward (left in FIG. 2) and the slide 10 itself will be compressed. On the driving side, the screw 14 to the rear of nut 28 and the shaft 35 will be axially compressed as well as torsionally distorted. The force to maintain these several distortions derives from the frictional torque of the continually rotating portions 47 and 49 of the clutch 64.

All of the distortions just described, plus bearing distortions and others not described, are minute in relation to the general dimensions of the machine. However, they can, and do, become significant when accuracies of a few thousandths of an inch are involved. If any of these deflections varies from one stop to another, the so-called positive stop position will vary accordingly. As all of the distortions mentioned are well within the elastic limits of the distorted members, the distortions will repeat practically perfectly providing the distorting force to each member is identical each time a stop is made.

As is clear from the preceding description, the distorting forces are all derived from the torque of the slipping clutch 64. This torque is transmitted to the various distorting members by way of anti-friction bearings, including the ball-nut 28, which can be relied upon to transmit the clutch torque to each distorting member with such minor variations as to be negligible. Thus, the desired equality of distortions depends upon slipping torque of the clutch 64 being constant.

It is well known in the art that the slipping torque of a friction clutch is not a constant. This fact is most noticeable as a continuing change (increasing or decreasing) over a period of time due to wear of the slipping faces. However, it is also true that the friction varies erratically from time to time due to the vagaries of friction itself and differences in the precise way the slipping surfaces engage at one time relative to another time. Regardless of the reasons, experience reveals that a slipping clutch cannot be relied upon to deliver a constant torque. While long time changes due to wear can be partially corrected by adjustment of the energizing electric current, the short period fluctuations must simply be accepted. The result is that the precise stopping location of the slide 10 will vary from time to time by amounts which are acceptable for some applications but intolerable for others.

In addition to the faults just explained experience shows that a slipping clutch such as 64 cannot be relied upon to provide a constant torque during a single engagement. Since a screw with ball nut is inherently reversible, lowering of torque from the clutch 64 permits the described distortions to relax partially and the slide 10 to drift back slightly. Thus, in the prior art it is not uncommon for the slide 10 to move slightly back and forth as the torque of clutch 64 varies.

In accordance with the invention, the above described disadvantages of the prior art are obviated. Referring to FIG. 3, the right end of worm shaft 67 is supported in radial ball-bearings 69 and 70. The inner races of the bearings 69 and 70 engage a portion 71 of the worm shaft 67. The outer races of these bearings are fitted in a bore 72 of a cap 73 just loosely enough to permit axial motion of the bearings in the bore 72. The inner races of bearings 69 and 70 are separated by a spacer 74. The inner race of bearing 69 abuts a shoulder 75 on the worm shaft and the inner race of bearing 70 abuts a flanged ring 76. A ball-thrust-bearing 77 fits on a portion of the worm shaft 67 between the ring 76 and a compression spring 78 compressed between bearing 77 and the end of a bore 79 of cap 73.

A clutch member 80 is fitted on the left end of worm shaft 67 over a portion 81 of the worm shaft 67 and keyed thereto by a key 82. Member 80 abuts an enlarged section 83 of worm shaft 67. Further to the left, shaft 67 has a portion 84 around which the inner race of a needle bearing 85 is fitted. This inner race is axially restrained between a snap ring 86 and the shoulder 87 defined by the reduction in shaft diameter between portions 81 and 84. The outer race of bearing 85 is received in a stepped bore 87 in a rotatable drive member 88. The outer race of needle bearing 85 is restrained against axial motion by a snap ring 89 and a shoulder 90 in the bore 87 in member 88.

The member 88 is supported by spaced radial ball bearings 91 and 92 whose outer races fit into a bushing 93 fitted into and attached to the housing 37. The bearings 91 and 92 are restrained axially relative to the bushing 93 by a snap ring 94 and a shoulder 95 on the cap 97. These bearing are restrained axially relative to member 88 by snap ring 96 and a shoulder 95a on member 88. The right-hand end of the rotatable member 88 has a clutch member 98 attached thereto.

Spring 78 acts through thrust bearing 77, ring 76, the inner races of bearings 69 and 70 and the shaft 67 to force the clutch member 80 against the clutch member 98. The spring 78 is selected or adjusted by suitable means (not shown) to be compressed to a predetermined force. Member 88 is constantly rotated by a pulley 99, a belt 100, pulley 101 and motor 16. The clutch members 80 and 98 are normally held in engagement by the spring 78.

Rapid motion of slide 10 is produced by the motor 15, with clutch 64 disengaged. When slow motion is required, motor 15 is electrically disconnected and clutch 64 is electrically engaged.

When the slide 10 encounters stop 21, worm 67 continues to drive worm wheel 68 and shaft 35 until the several distortions (previously described) rise to a predetermined value. During this rise, the tangential force at the pitch line of the worm gear 68 increases and is exerted against the spring 78. When this tangential force equals the precompression force of spring 78, worm gear 68 stops and worm 67 acts as a screw, using teeth of worm wheel 68 as a partial nut, and moves axially to further compress spring 78.

The worm 67 is free to move as a screw by slipping the outer races of bearings 69 and 70 in the bore 72 and also by slipping the inner race of needle bearing 85 relative to the needles and/or the outer race.

When the worm shaft 67 has moved a barely perceptible amount to the right (FIG. 3), the clutch surfaces of the members 80 and 98 disengage so that torque from the member 88 is no longer transmitted to shaft 67. The exact amount of shaft motion required to disengage the 80–98 clutch fully is not definable due to compressions and distortions of the members under stress. However, as a very important feature of this invention, it has been found that the rotational kinetic energy of the shaft 67 and attached parts keeps the worm turning long enough to cause the friction surfaces of members 80 and 98 to be separated by an amount in the order of five to twenty thousandths of an inch. The exact amount of separation depends on several conditions including the moment of inertia of the shaft 67 and those parts rotating with it, the friction between the worm wheel 68 and the worm 67, the compression rate of spring 78, the stopping distortions, the speed of shaft 67 and those parts rotating with it before clutch disengagement and various friction points. Experience has shown that, with a given assembly of parts and a given speed of worm 67, the separation of the clutch faces varies negligibly.

Since, at the time the slide 10 encounters an obstruction, the shaft 67 is rotating at a relatively high speed, due to the worm reduction and the screw 14, the few thousandths of an inch of clutch separation occurs in a very short time. Thus, the clutch release is almost instantaneous and involves essentially no slippage with the surfaces in contact. A test run of several thousand stops resulted in no distinguishable wear of the clutch faces.

When the shaft 67 stops, the spring 78 acts axially on that shaft and thus tangentially on the worm wheel 68 to maintain the stopping distortions previously enumerated. That is, spring 78 maintains equilibrium between its force and the stopping forces. Although the relation between the screw 14, and its nut is reversible, it was hereinabove mentioned that the ratio of the worm reduction at 67, 68 is such as to preclude rotation of the worm by the worm wheel. This feature prevents the stopping forces from rotating the worm 67 in any way to allow the clutch 80–98 to re-engage. Thus, the stopping forces and the spring 78 maintain an equilibrium condition and the final stopping position of slide 10 remains constant for any desired period of time. This distinguishes from the prior art wherein the slide 10 could vary somewhat due to vagaries of the slipping of clutch 64. Moreover, there is no wearing of clutch 80–98 regardless of the time the slide 10 is held against the stop. Conversely, the clutch 64 of the prior art is subject to wear and readjustment or replacement. Such repair of clutch 64 becomes more frequent as the length of stall time of slide 10 increases. Such attention to the condition of clutch 64, in the prior art, has been a severe maintenance problem widely recognized in industry.

When control circuitry signals the termination of the time for holding slide 10 against its stop, the clutch 64 is de-energized and motor 15 is electrically connected for reverse rotation.

De-energizing clutch 64 disconnects worm wheel 68 from the screw shaft 35. This removes the stopping forces from worm wheel 68, worm 67 and spring 78. Spring 78 very rapidly forces member 80 back into contact with member 98. This re-engagement of clutch 80–98 causes motor 16 again to drive worm 67, worm wheel 68 and shaft 43. Since the last described group of members is no longer connected to any working load, clutch 64 being disengaged, the engagement of clutch 80–98 has only to pick up the inertia and friction load of these parts themselves. In terms of the torque capacity of clutch 80–98, it can pick up this idle load with negligible slippage and hence, negligible wear. As previously noted, experience has shown that wear of clutch 80–98 over a long period of repeated cycles is indeed imperceptible.

The return motion of the slide 10 is effected by motor 15.

The mechanism embodying the invention results in greatly reduced wear on clutch 64 since this clutch 64 never has to slip while the slide 10 is stopped. Some wear of clutch 64 still occurs since it must slip while reducing the speed of shaft 35 from traverse to feed rate. Clutch 64 remains a device requiring adjustment and/or replacement but the maintenance of it is significantly reduced. Moreover, the exact slipping torque of clutch 64 is no longer critical since this slipping torque is not now involved in setting and holding the magnitude of the force of the slide against the stop.

FIG. 5 shows a fragment of FIG. 3 with a modification which may be desirable in some embodiments of the invention. In FIG. 5, the shaft of worm 67 has been extended through the cap 73*a* and a flywheel 105 is mounted thereon. The purpose of this flywheel is to add rotational inertia to the shaft 67 and the parts rotating therewith.

As previously described, the rotational inertia of shaft 67 and its attachments is presumed to be sufficient to cause slight coasting or overrun for the purpose of effectng complete disengagement of clutch 80–98 after worm wheel 68 has stopped turning. In a specific case, the rotating parts may be too light, the frictions may be too great or the speed of member 88 may be too low to cause sufficient overrun. In such cases, the flywheel 105 may be included to provide additional rotational inertia to cause the quick disengagement of clutch 80–98.

In the forms of the invention described in connection with FIGS. 1–3, a positive stop was encountered in one direction only (left in FIG. 1). Machine tools are also common in which slow feed and stop encounter may be at both ends of slide travel. For example, a slide such as 10 may carry a work piece rather than cutting tools and such cutting tools may be positioned on other structural machine supports for the purpose of machining both ends of the work piece.

Figure 4:
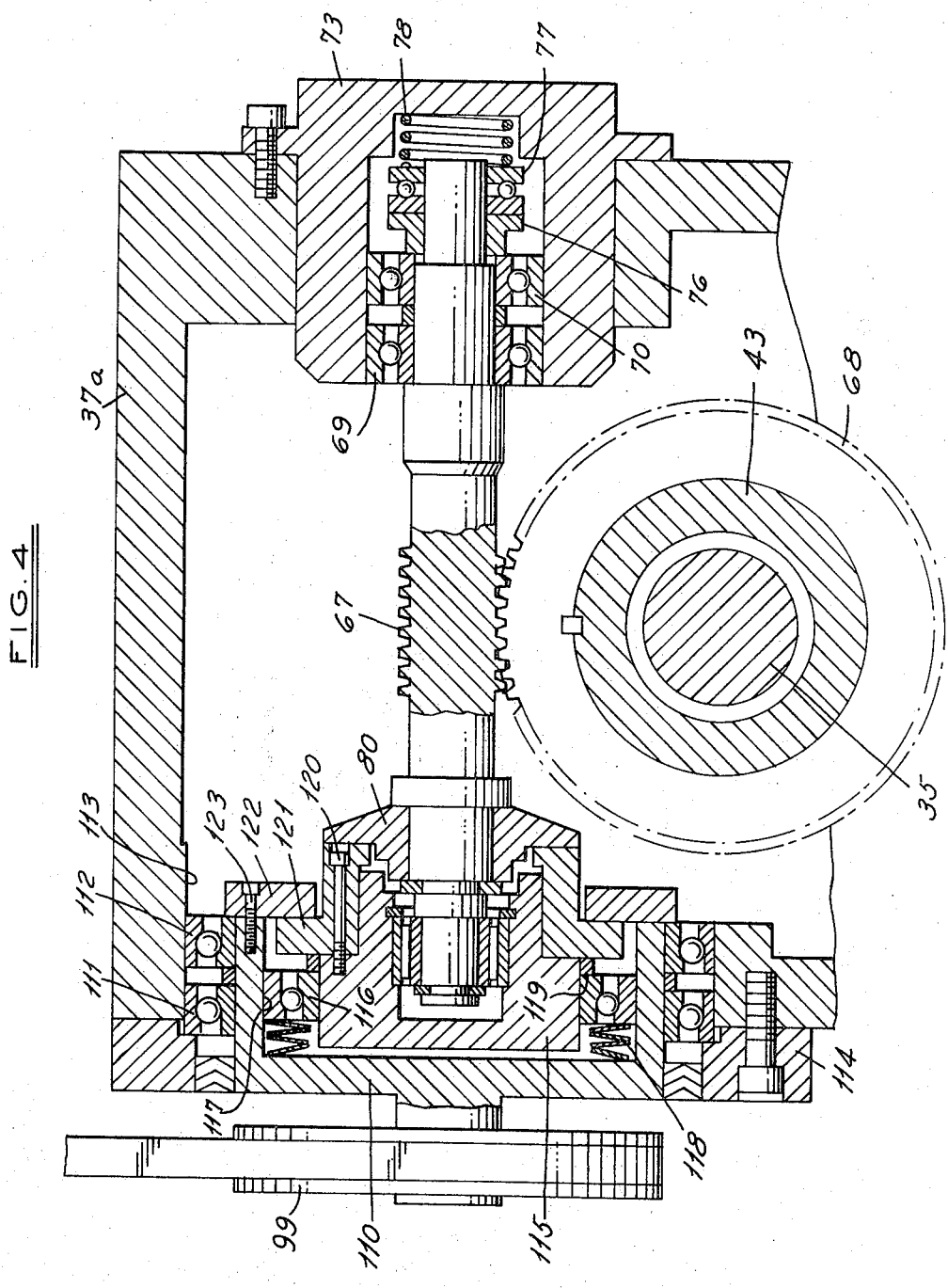
FIG. 4 is a fragmentary sectional view similar to FIG. 3 of a modified form of the invention.

FIG. 4 shows a modification to provide clutch disengagement when worm wheel 68 is forcefully stopped when rotating in either direction. Reverse of the feeding motion would be accomplished by electrically reversing motor 16.

In FIG. 4, the worm 67 and its attached parts are identical to those in FIG. 3. The right-hand end of this shaft is also supported and constrained identically to FIG. 3. The left side of FIG. 4 comprises driving parts different from those of FIG. 3.

In FIG. 4, the pulley 99 drives an outer drive member 110 which is rotatably supported by anti-friction bearings 111 and 112 fitted into a bore 113 in housing 37*a* and restrained from leftward axial motion by a cap 114. A second drive member 115 is supported by an anti-friction bearing 116 in a bore 117 in the member 110. The outer race of bearing 116 is axially shiftable within the bore 117 in the member 110. This outer race is urged toward the right by a precompressed spring 118. The force of this spring 118 is transmitted through bearing 116 and the inner race thereof to a shoulder 119 on member 115. Fitted over a reduced diameter portion of member 115 and attached thereto by a plurality of screws 120 is a flanged ring 121. Ring 121 is made of a material having a relatively high coefficient of friction such as the material of the ring 98 in FIG. 3. A ring 122 is attached to member 110 as by screws 123. Ring 122 engages the outer flange of ring 121. The rightward force of spring 118 is constrained by the overlapping interface of rings 121 and 122. This interface constitutes a clutch by which driving torque is transmitted from member 110 to member 115 as will be discussed further hereinafter.

The spring 118 may consist of a stack of Belleville washers. Stacks of such washers are commonly used, as here, to provide relatively large force in a short compressive length. As will be described below, the precompressed force of spring 118 should preferably be about twice the magnitude of the precompressed force of spring 78.

The right-hand end of the ring 121 mates with member 80 to form a second clutch interface. The engaging force for the 80–121 clutch is provided by spring 78 as described in relation to FIG. 3.

As so far described, it may be seen that driving torque is transmitted to member 115 by the clutch 122–121 interface and from member 115 to the worm 67 by the 121–80 interface. Thus, when worm wheel 68 is not loaded beyond its normal maximum working load, it may be driven in either direction by motor 16.

If the worm wheel is driven in the direction assumed in describing FIG. 3 and is stopped by a so-called positive stop, the worm 67 will move axially to the right against spring 78 and disengage the 121–80 clutch exactly as described in the discussion of FIG. 3. If the drive is in the opposite direction, stopping of worm wheel 68 will cause worm 67 to move axially to the left. The force of this leftward motion of 67 will be transmitted by member 80 and ring 121 to the member 115 which will move slightly leftward against spring 118. This slight motion will disengage the clutch interface between ring 122 and ring 121. In the manner previously described, the rotational inertia of the worm 67 and its rotationally attached parts will provide sufficient overrun to make a complete disengagement of the 121-122 clutch interface.

With the 121-122 clutch disengaged, the driving member 110 will continue to rotate. The outer race of bearing 116 will rotate but will permit the inner race to be stationary with member 115. In this case the tangential force on worm wheel 68 to maintain equilibrium with the stopping forces will be furnished by spring 118.

The reason for providing twice as much precompressive force by spring 118 as by spring 78 is that spring 78 is opposing spring 118 when the latter is compressed to disengage clutch 121-122. The maintaining force available tangentially to worm wheel 68 will then be the force of spring 118 minus the force of 78. However, when clutch 80-121 is disengaged, the force of spring 118 is completely resisted by ring 122 and only the spring 78 is effective tangentially to worm wheel 68. In order for the force of spring 118 minus the force of 78 to be equal to the force of 78 alone, it is necessary for the force of spring 118 to be twice the force of spring 78. Of course, in some embodiments, it may be desirable for the stop-holding force to be greater in one direction than the other. In that case other relations between the precompressive forces of springs 78 and 118 may be provided by design of the springs or by providing adjustments.

I claim:

1. In a machine tool, the combination comprising the base,
a support movable on the base,
a fixed stop on the base,
a lead screw on said base for moving the support on the base toward and away from the stop,
first drive means operable to drive the lead screw at a first speed,
second drive means operable to drive the lead screw at a second speed less than the first speed,
first clutch means energizable to provide a driving connection between said second drive means and said lead screw,
second clutch means provided between said second drive means and said first clutch means and being normally operable to provide a driving connection between said second drive means and said first clutch means,
said second clutch means being operable upon engagement of the support with the stop with a predetermined force to disengage the drive between said second drive means and said first clutch means,
said second clutch means comprising a worm,
bearing means mounting said worm for unlimited rotation and limited axial movement,
a worm wheel meshing with said worm and with said lead screw,
and a clutch providing a driving connection between said second driving means and said worm,
the helix angle of the worm and the worm wheel being such as to preclude driving of the worm by the worm wheel,
said last-mentioned clutch comprising a first clutch member connected to said second driving means
a second clutch member connected to said worm,
said first and second clutch members being engaged and disengaged by axial motion of said worm,
spring means urging the worm axially to engage said first and second clutch members and to maintain the clutch members in engagement when the load on the worm wheel does not exceed a predetermined maximum,
said spring being adapted to permit disengagement of the clutch member when the worm wheel stops due to excess torsion load thereby causing the worm to move axially relative to the worm wheel and causing the moment of inertia of the worm and associated parts to overrun the worm such as to disengage the clutch members.

2. The combination set forth in claim 1 including a third clutch operable upon axial movement of the worm in an opposite direction and functioning to disengage the driving connection from said second driving means when the torsional load in the opposite direction exceeds a predetermined amount.

3. In a transmission:
a driving worm,
a driven worm wheel,
a source of rotational power for said worm,
a torsional load driven by said worm wheel,
said torsional load having a maximum normal value and subject to excursions exceeding said normal maximum,
a transmission housing,
bearings in said transmission housing for supporting said worm for unlimited rotation and for restricted axial movements,
a first clutch member attached to said source of rotational power,
a second clutch member attached to said worm,
said first and second clutch members being frictionally engaged and disengaged by the axial motion of said worm,
spring means adapted to urge the worm axially to engage said first and second clutch members,
said spring means being pre-stressed to maintain the clutch members engaged when the load on the worm wheel does not exceed the said normal maximum,
the said pre-stress of the said spring being further adapted to permit disengagement of said clutch members when the worm wheel stops due to excess torsional load thereby causing the worm to move axially as a screw, relative to teeth of the stopped worm wheel and the moment of inertia of the said worm and attached parts being sufficient to cause overrun of the worm whereby the said clutch parts are completely disengaged.

4. In a machine tool, the combination comprising the base,
a support movable on the base,
a fixed stop on the base,
means for moving the support on the base toward and away from the stop, first drive means operable to drive the moving means at a first speed,
second drive means operable to drive the moving means at a second speed less than the first speed,
first clutch means energizable to provide a driving connection between said second drive means and said moving means,
second clutch means provided between said second drive means and said first clutch means and being normally energized to provide a driving connection between said second drive means and said first clutch means, said second clutch means being operable upon engagement of the support with the stop with a predetermined force to disengage the drive between said second drive means and said first clutch means, said moving means comprising a lead screw, said second clutch means comprising a worm, bearing means mounting said worm for unlimited rotation and limited axial movement, a worm wheel connected to said lead screw and meshing with said worm, and a clutch providing a driving connection between said second driving means and said worm, the helix angle of the worm and the worm wheel being such as to preclude driving of the worm by the worm wheel, said clutch comprising a first clutch member connected to said second driving means, a second clutch member connected to said worm, said first and second clutch members being engaged and disengaged by axial motion of said worm, spring means urging the worm axially to engage said first and second clutch members and to maintain the clutch members in engagement when the load on the worm wheel does not exceed a predetermined maximum, said spring being adapted to permit disengagement of the clutch member when the worm wheel stops due to excess torsion load thereby causing the worm to move axially relative to the worm wheel and causing the moment of inertia of the worm and associated parts to overrun the worm such as to disengage the clutch members.

5. The combination set forth in claim 4 including a third clutch operable upon axial movement of the worm in an opposite direction and functioning to disengage the driving connection from said second driving means when the torsional load in the opposite direction exceeds a predetermined amount.

6. The combination set forth in claim 4 including supplemental inertia means on said worm.

* * * * *